(12) United States Patent
Li et al.

(10) Patent No.: US 8,045,233 B2
(45) Date of Patent: *Oct. 25, 2011

(54) METHOD FOR CONTROLLING THE SHAPES OF FM-AM MIXED DOTS ON A MULTI-BIT DEPTH IMAGING APPARATUS

(75) Inventors: Haifeng Li, Beijing (CN); Bin Yang, Beijing (CN)

(73) Assignees: Peking University Founder Group Co., Ltd., Beijing (CN); Beijing Founder Electronics Co., Ltd., Beijing (CN); Peking University, Beijing (CN)

( * ) Notice: Subject to any disclaimer, the term of this patent is extended or adjusted under 35 U.S.C. 154(b) by 641 days.

This patent is subject to a terminal disclaimer.

(21) Appl. No.: 12/091,287

(22) PCT Filed: Apr. 29, 2006

(86) PCT No.: PCT/CN2006/000857
§ 371 (c)(1),
(2), (4) Date: Apr. 23, 2008

(87) PCT Pub. No.: WO2007/048290
PCT Pub. Date: May 3, 2007

(65) Prior Publication Data
US 2008/0285085 A1 Nov. 20, 2008

(30) Foreign Application Priority Data
Oct. 26, 2005 (CN) .......................... 2005 1 0116636

(51) Int. Cl.
*G06K 15/00* (2006.01)
(52) U.S. Cl. ..................... 358/3.06; 358/3.14; 358/3.17; 358/3.18
(58) Field of Classification Search .................. 358/3.06, 358/3.16, 3.14, 3.17, 3.18
See application file for complete search history.

(56) References Cited

U.S. PATENT DOCUMENTS 5,818,604 A * 10/1998 Delabastita et al. ......... 358/3.19
6,515,768 B1 * 2/2003 Deschuytere et al. ....... 358/3.06
(Continued)

FOREIGN PATENT DOCUMENTS
CN 1668063 A 9/2005
(Continued)

OTHER PUBLICATIONS

Goldschneider, et al.; "Embedded Multilevel Error Diffusion"; SID 95 Digest; ; May 23-25, 1995; pp. 829-832; vol. 26; SID International Symposium Digest of Technical Papers; Santa Ana, SID U.S.; XP000657189.
Broja, et al.; "Error Diffusion Concept for Multi-level Quantization"; Optics Communications; Nov. 1, 1990; pp. 280-284; vol. 79; No. 5; North-Holland Publishing Co.; Amsterdam, NL, XP022564810.

*Primary Examiner* — Chan S Park
*Assistant Examiner* — Allen H Nguyen
(74) *Attorney, Agent, or Firm* — The Webb Law Firm (57) ABSTRACT

Disclosed is a method for controlling the shapes of FM-AM mixed halftone dots on the multi-bit depth imaging apparatus. In the prior art, since the reproduction of the shapes of the dots in various gradations is absolutely based on the theory of random error diffusion and is influenced by the dynamic controlling output mechanism for the multi-bit dots, it is hard to assure the controllability of the shapes of the dots in a certain gradation. Based on the prior art, the dynamic statistic algorithm with adjacent output gray levels is introduced to assure the controllability of the shapes of the dots and solve the problem of random change of the shapes of the dots due to the randomicity of the error diffusion. According to the disclosed method, the features of the multi-bit imaging apparatus can be achieved fully in light of the requirements of the dots on the basis of the original method for multi-bit FM-AM mixed screening using error diffusion based on dual-feedback. The effect of FM-AM mixed halftone screening can be achieved under low resolution with controllable shapes of the dots. The problem of granular sensation can be solved during the practical output of the mixed halftone dots so as to assure the smooth effect of the gradations.

18 Claims, 3 Drawing Sheets

U.S. PATENT DOCUMENTS

| | | |
|---|---|---|
| 6,690,837 B1 * | 2/2004 | Broddin et al. .............. 382/254 |
| 2002/0039199 A1 | 4/2002 | Nose et al. |
| 2003/0035146 A1 * | 2/2003 | Yu et al. ..................... 358/3.14 |
| 2004/0130753 A1 | 7/2004 | Crounse |
| 2004/0218222 A1 * | 11/2004 | Damera-Venkata ......... 358/3.13 |
| 2004/0252346 A1 * | 12/2004 | Huang et al. ................ 358/3.14 |
| 2008/0278765 A1 * | 11/2008 | Li et al. ...................... 358/3.16 |

FOREIGN PATENT DOCUMENTS

| | | |
|---|---|---|
| EP | 0702482 A2 | 3/1996 |
| JP | 11146189 A | 5/1999 |
| JP | 2004172798 A | 6/2004 |

* cited by examiner

METHOD FOR CONTROLLING THE SHAPES OF FM-AM MIXED DOTS ON A MULTI-BIT DEPTH IMAGING APPARATUS

FIELD OF THE INVENTION

The present invention relates to a method for producing halftone dots in the field of hard copying for image duplication, more particularly to a method for controlling the shapes of FM-AM mixed dots on a multi-bit depth imaging apparatus.

BACKGROUND OF THE INVENTION

The hard copying for image duplication generally relates to the screening and plate-making technology for printers and the advanced printing and plate-making device. The screening technology used for duplicating an image with hard copying is also called the digital image halftone technology. The digital image halftone technology comprises amplitude-modulation (AM) screening and frequency-modulation (FM) screening. The amplitude-modulation screening technique is also called ordered dithering of gathered dots, characterizing in that, the colored points in a produced halftone image are gathered in pairs geometrically to form clusters of colored regions called dots. Since the technology controls the size of the dots to represent the gray level of the original image, the dots are called amplitude-modulation dots.

For the mixed screening technology based on the FM and AM screens in the prior art, the applicants have filed a Chinese Patent Application "method for frequency-modulation screening using error diffusion based on dual-feedback" (Application No. 200510068127.8, published on Sep. 14, 2005), wherein the disclosed technology is mainly based on a general algorithm for generating dots on the single-bit or multi-bit depth imaging apparatus. During the output of dots using the practical apparatus, since the reproduction of the shapes of the dots in various gradations using conventional methods is absolutely based on the theory of random error diffusion, it is hard to assure the controllability of the shapes of the dots in a certain gradation. Furthermore, the shapes of multi-bit dots are hard to control due to the influence of a dynamic controlling output mechanism for multi-bit dots on the multi-bit depth imaging apparatus, so that the shapes and features of the output multi-bit dots do not possess the features which the multi-bit dots should possess, such as the increasing uniformity of the gradations. During the practical output, some problems (such as the incompatibility of the size of dots and the granular sensation in the whole image) arise to impact the quality of the output image.

Since the FM-AM mixed halftone dots output by the multi-bit depth imaging apparatus possess the feature of size of the AM dots, the change of the size of the dots in various gradations is similar to that of the AM dots. That is, the sizes of the dots increase with the enhancement of the gradation. In the low-density zone, the dots are independent on and separate from each other In the medium-density zone, the sizes of the dots increase and some of the dots are overlapping to each other so that independent dots and overlapping dots coexist. The randomicity impacts the features of the dots in the two density zones so as to result in different features in shape of different dots and a series of problems of quality of output dots. Thus, for the quality of multi-bit mixed dots, the main problem is how to control the compatibility of the shapes of dots in the low-density and medium-density zones.

SUMMARY OF THE INVENTION

To overcome the shortcomings of the prior art, the present invention is to provide a method for controlling the shapes of FM-AM mixed halftone dots on the multi-bit depth imaging apparatus. The method can assure the controllability of the shapes of dots for the conventional technology of FM-AM multi-bit mixed dots and solve the problem of random change of the shapes of dots due to the randomicity of the error diffusion so as to achieve effectively the output effect of the mixed halftone dots on the multi-bit depth imaging apparatus and improve the output quality of mixed dots.

In order to accomplish the above object, the present invention provides a method for controlling the shapes of FM-AM mixed halftone dots on the multi-bit depth imaging apparatus, comprising:

1) dividing averagely an interval [0, 255] into $2^n-1$ gradations in light of a bit depth n of the apparatus:

[0, $R_1$], ($R_1$, $R_2$], ..., ($R_{i-1}$, $R_i$], ... ($R_{2-2^n}$, 255], wherein corresponding ranges of a dot-matrix of bit-outputting are (0, $Out_1$), ($Out_1$, $Out_2$), ..., ($Out_{i-1}$, $Out_i$), ... ($Out_{2-2^n}$, 11 ... 1), the $Out_i$ being a binary representation of the n-bit depth, and a threshold $M_i$ of a central point of each of the gradations is sampled as a threshold comparison parameter for the gradation;

2) setting output probability thresholds with a n-bit imaging depth in the interval [0, 255];

wherein the step 2) further comprises setting $2^n-2$ integers $L_1, L_2, ..., L_i, ..., L_{2-2^n}$ as the output probability thresholds with the n-bit imaging depth, and adjusting the probability thresholds based on requirements of the apparatus;

3) processing respectively the dots in the $2^n-1$ gradations ($R_{i-1}$, $R_i$) based on an FM-AM mixed screening process using a dual-feedback error diffusion; the detailed process comprises:

(a) carrying out an operation T of a threshold comparison on a final input value g"(m, t) of a current pixel of an original image, and then converting a result of the operation to a corresponding value b(m, t) of the current pixel for a halftone image;

wherein the step (a) uses a process of bidirectional scanning when the original image is scanned, wherein, when a certain row is scanned from left to right, a next row is subsequently scanned from right to left;

(b) comparing the value b(m, t) of the pixel with an input value g'(m, t) of the same pixel to obtain a difference between b(m, t) and g'(m, t), wherein the difference is an error value e(m, t), and the input value g'(m, t) is used for obtaining the threshold;

(c) multiplying the error value e(m, t) by preset weight distribution coefficients through an error diffusion filter c and then diffusing results of the multiplying to unprocessed pixels around the current pixel, wherein each of the diffused results to the unprocessed pixels around the current pixel is weightedly added to an original input value g(m, t) of the corresponding pixel of the original image to obtain an input value g'(m, t) of the corresponding pixel of the original image;

wherein, further, the error diffusion filter e uses a diffusion principle and weight distribution coefficients as below:

|       |       | **    | $d_5$ | $d_3$ |
|-------|-------|-------|-------|-------|
| $d_2$ | $d_4$ | $d_5$ | $d_4$ | $d_2$ |
| $d_1$ | $d_2$ | $d_3$ | $d_2$ | $d_1$ | wherein, ** represents the current pixel's position, each of arithmetic ratios on other positions represents the diffusion weight coefficient relative to the current pixel, and the diffusion weight coefficients are taken in [0, 1] and satisfy an expression as below:

$$2d_1+4d_2+2d_3+2d_4+2d_5 \in [0,1];$$

(d) diffusing processed results to corresponding unprocessed pixels surrounding the current pixel, respectively, and weightedly adding each of the diffused processed results to the original input value g(m, t) of the corresponding pixel of the original image to obtain the final input value g"(m, t) of the corresponding pixel, wherein the processed results are obtained by implementing a multiplying operation on the output value b(m, t) of the current pixel using a diffusion filter w and processing results of the multiplying operation with a dithering algorithm, and the step (d) is implemented in parallel with the steps (b) and (c);

wherein, further, a diffusion mode of the diffusion filter w is set as:

| | ** | $w_0$ |
|---|---|---|
| $w_3$ | $w_2$ | $w_1$ | wherein, a scanning direction is from left to right, ** represents the current pixel's position, each of parameters on other positions represents the diffusion weight coefficient relative to the current pixel, the parameters are taken in [0, 1] and satisfy an expression as below:

$$w_{sum}=(w_0+w_1+w_2+w_3)\in[0,1]; \text{ and}$$

the dithering algorithm for the diffusion filter w in the step (d) are as below:

$$fRand=(R(m,t)/R\_MAX-0.5)\times cDither$$

$$dw_0=w_0-fRand$$

$$dw_2=w_2+fRand$$

$$dw_1=w_1+fRand$$

$$dw_3=w_3-fRand$$

wherein, fRand is a parameter for fine adjusting dithering; R(m, t) is a parameter with random value for scanning the current dot, R_MAX is a maximum of a random parameter R(i); cDither is a parameter for adjusting amplitude of dithering and determines the performance of amplitude-modulation; and $dw_0 \sim dw_3$ are the diffusion weight coefficients of the diffusion filter w in different directions after dithering; and (e) repeating the steps (a)-(d) until the original input values g(m, t) of all pixels are processed; and 4) computing dynamically output dot-matrix data, by using a known dynamic gradation-changeable output mechanism and a dynamic statistic algorithm with adjacent output gray levels in light of the probability thresholds $F_i$ and an accumulated value ShapeCur for controlling the shape of a current dot, to control the shapes of the dots, when mixed screening in the gradations $(R_{i-1}, R_i)$ is achieved;

wherein the dynamic gradation-changeable output mechanism in the step 4) comprises:

generating a pseudo-random value of the current dot in light of ShapeCur:

$$F_i=random(ShapeCur) \qquad \text{Formula 1}$$

wherein, the pseudo-random function random is to be generated automatically in a compiling environment, $F_i \in [0, 255]$; and the output dot-matrix data are computed dynamically:

$$OUT = \begin{cases} I_1 = \begin{cases} 0 & \ldots F_i \in [0, L_1] \\ Out_1 & \ldots F_i \in (L_1, L_2] \\ \ldots \\ Out_{i-1} & \ldots F_i \in (L_{i-2}, L_{i-1}] \end{cases} \\ I_2 = \begin{cases} Out_i & \ldots F_i \in (L_{i-1}, L_i] \\ Out_{i+1} & \ldots F_i \in (L_i, L_{i+1}] \\ \ldots \\ 11 \ldots 1 & \ldots F_i \in (L_{2^n-2}, 255] \end{cases} \end{cases} \quad \text{Formula 2}$$

wherein the step 4) further comprises:

(a) determining density zones to be adjusted for controlling the shapes of the dots in light of a linear output feature of the apparatus;

(b) determining the shapes of the dots to be adjusted in light of parameters for adjusting a pulse-width in the apparatus, existing random shapes of the dots in the density zones, and requirements relating to a stability of the apparatus;

(c) determining desired and undesired shapes of the dots, respectively, in light of the determined shapes of the dots to be adjusted in the step (b) and imaging features of the apparatus; and (d) setting controlled dots around the current dot by using the dynamic statistic algorithm with the adjacent output gray levels, in light of the density zones of the FM-AM mixed dots and existing output gray level gradations, so as to work out output range parameters of the mixed dots;

wherein the dynamic statistic algorithm in the step (d) comprises:

i) letting the output gray level of a dot which is preceding to the current dot be a and that of a dot which is preceding to the dot with the output grey level a be b;

ii) letting the output gray level of a dot which is above the current dot be c, that of a dot which is preceding to the dot with the output grey level c be d, and that of a dot which is following to the dot with the output grey level c be e;

iii) letting the output gray level of a dot which is above the dot with the output grey level c be f; and iv) letting statistic parameters for the output gray levels around the current dot as below:

| $Sum_1 = a + c + d$ | $Sum_2 = a + b$ | $Sum_3 = c + f$ |
|---|---|---| wherein, $Sum_1$ denotes a weighted sum of the output gray levels in a 2 2 matrix around the current dot, $Sum_2$ denotes a weighted sum of the output gray levels of two dots preceding horizontally to the current dot, and $Sum_3$ denotes a weighted sum of the output gray levels of two dots preceding vertically to the current dot;

further, the following two processes for controlling dynamically the output gray levels are used in the step 4): a process for dynamic gradation-changeable output and a dynamic statistic process with the adjacent output gray levels. Both of the two processes are indispensable.

The present invention has the following effects. According to the method of the present invention, the features of the multi-bit imaging apparatus can be achieved fully in light of the requirements of the dots on the basis of the conventional method for multi-bit FM-AM mixed screening using error diffusion based on dual-feedback. The effect of FM-AM mixed halftone screening with controllable shapes of the dots can be achieved under low resolution. The problem of granular sensation can be solved during the practical output of mixed halftone dots so as to assure the smooth effect of the gradations.

DESCRIPTION OF THE PREFERRED EMBODIMENTS

Hereinafter, a detailed description of the present invention will be given with reference to the appended drawings and embodiments.

Based on the known FM-AM mixed screening method with a multi-bit imaging depth using the dual-feedback error diffusion, the present invention uses a generation algorithm for dynamically and accurately controlling the shapes of dots to provide a method for controlling the shapes of FM-AM mixed halftone dots using a multi-bit depth imaging apparatus. An embodiment of the present invention is described as below.

In the embodiment, an output apparatus with the 2-bit imaging depth (n=2) is used. The dots should satisfy the following conditions for the known technique of adjusting the pulse-width in an apparatus (The pure white is set as 255 and the pure black is set as 0).

In the low-density zone (171-255), the dots do not overlap each other and are independent on each other. Thus, the output value of a single-pixel dot is required as 3 (i.e. 11 in binary); the output of a double-pixel dot is required as any combination of 3 and 1; and the outputs of a triple-pixel dot and a multi-pixel (>3) dot are required to avoid more than one "3" being arranged in a column or a row.

In the medium-density zone (84-171), independent dots and overlapping dots coexist. Thus, besides the requirements for the low-density zone, the rule of compatibility of the size of most dots in the same gradation and that of progressive increase of the number of pixels of a dot in various gradations should be complied with so that the feature of the output dots comes near to that of dots with the 2-bit imaging depth.

In the high-density zone (0-84), since the output apparatus in the embodiment is a laser printer with low resolution, the dots in this zone are not limited by the printer's linear feature of printing. The output of this zone complies with the inherent rule of output of multi-bit dots.

Based on the above requirements of the output apparatus, a detailed practical solution is described as below.

Step 1 is to averagely divide the interval [0-255] into three gradations (because the bit depth n of the apparatus is 2 and $2^n-1=3$):

[0, 84], (84, 171] and (171, 255].

The corresponding ranges of a dot-matrix of bit-outputting are (11, 10), (10, 01) and (01, 00).

For the practical output in the embodiment, the pure black is set as 0 and the pure white is set as 255.

The thresholds $M_i$ ($M_1=42$, $M_2=127$ and $M_3=212$) of the central points of the three gradations are sampled as threshold comparison parameters for their respective gradations.

Step 2 is to set two (because $2^n-2=2$) integers $F_1=8$ and $F_2=24$ as output probability thresholds with the n-bit imaging depth in the interval [0, 255]. The output probabilities of 11, 10, 01 and 00 are influenced by the thresholds so as to obtain the effect of output of 2-bit mixed dots.

Step 3 is to respectively process the dots in the three gradations based on the known FM-AM mixed screening method using the dual-feedback error diffusion. The detailed process is described as below.

(a) The original image is scanned and input. An operation T of a threshold comparison is carried out on the pixel value g"(m, t) of the current pixel in the original image. The result of the operation is converted to the corresponding value b(m, t) of the current pixel for a halftone image.

In order to avoid the interference phenomenon caused by the scanning direction and the frequency of the dots with random distribution (popularly called "Moire"), the embodiment uses a bidirectional scanning method for scanning the data of the original pixels.

(b) The value b(m, t) of the current pixel is compared with the input value g'(m, t) of the current pixel to obtain the difference (i.e. an error value e(m, t)) between b(m, t) and g'(m, t).

(c) The error value e(m, t) is multiplied by certain weight distribution coefficients through an diffusion filter e. Then, the results of multiplying are diffused to those unprocessed pixels around the current pixel. Each of the diffused results to the unprocessed pixels around the current pixel is weightedly added to the original input value g(m, t) of the corresponding pixel of the original image to obtain an input value g'(m, t) of the corresponding pixel. The error diffusion filter uses a diffusion principle and weight distribution coefficients as below:

|       |       | **    | $d_5$ | $d_3$ |
|-------|-------|-------|-------|-------|
| $d_2$ | $d_4$ | $d_5$ | $d_4$ | $d_2$ |
| $d_1$ | $d_2$ | $d_3$ | $d_2$ | $d_1$ | wherein, ** represents the current pixel's position and each of the arithmetic ratios on the other positions represents the diffusion weight coefficient relative to the current pixel. In the embodiment, the coefficients are set as:

$d_1=1/44, d_2=2/44, d_3=5/44, d_4=4/44, d_5=8/44$.

The steps (b) and (c) accomplish the first diffusion feedback operation and implement the basic principle of error diffusion.

(d) This step is implemented in parallel with the steps (b) and (c). Processed results are respectively diffused to corresponding unprocessed pixels surrounding the current pixel, and each of the diffused processed results and each of the parameters of error diffusion in the steps (b) and (c) are weightedly added to the original input value g(m, t) of the corresponding pixel of the original image to obtain the final input value g"(m, t) of the corresponding pixel, wherein the processed results are obtained by implementing a multiplying operation on the output value b(m, t) of the current pixel using the second diffusion filter w and processing the results of the multiplying operation with the dithering algorithm. The diffusion mode of the second diffusion filter w is set as:

|       | **    | $w_0$ |
|-------|-------|-------|
| $w_3$ | $w_2$ | $w_1$ | wherein, the scanning direction is from left to right, ** represents the current pixel's position and each of the parameters on the other positions represents the diffusion weight coefficient relative to the current pixel. The parameters are taken in [0, 1] and satisfy the following expression:

$$w_{sum}=(w_0+w_1+w_2+w_3)\epsilon[0,1].$$

The dithering algorithm in the embodiment uses the following Formula:

$$fRand=(R(m,t)/R\_MAX-0.5)\times cDither$$

$$dw_0=w_0-fRand$$

$$dw_2=w_2+fRand$$

$$dw_1=w_1+fRand$$

$$dw_3=w_3-fRand$$

In this Formula, fRand is a parameter for fine adjusting dithering; R(m, t) is a parameter with random value for scanning the current dot; R_MAX is the maximum of the random parameter R(i); cDither is a parameter for adjusting amplitude of dithering and determines the performance of amplitude-modulation; and $dw_0$~$dw_3$ are the diffusion weight coefficients of the filter w in different directions after dithering.

This step (d) accomplishes the second diffusion feedback operation and implements the amplitude-modulation characteristic of the frequency-modulation screen.

In the embodiment, the coefficients are set as:

$$w_0=w_2=0.175, w_1=w_3=0.025, \text{then } w_{sum}=0.4$$

$$cDither=0.2$$

During screening, the size of the frequency-modulation halftone dots is changed by adjusting $w_{sum}$ apes of the frequency-modulation halftone dots is controlled by adjusting the values of $w_0$~$w_3$.

(e) The steps (a)-(d) are repeated until the original input values g(m, n) of all the pixels are processed.

In step 4, the dynamic gradation-changeable output mechanism is used in light of the probability thresholds ($L_1$=8, $L_2$=24) and an accumulated value ShapeCur for controlling the shape of the current dot, when the mixed screening in the three gradations is achieved. The algorithm of this step uses the following formula (A pseudo-random value of the current dot is generated on the basis of ShapeCur and Formula 1):

$$F=random(ShapeCur)$$

wherein, the pseudo-random function random can be generated automatically in the compiling environment. (F$\epsilon$[0, 255])

The output dot-matrix data are computed dynamically on the basis of Formula 2.

The output dot-matrix data are computed dynamically to control the shapes of the dots based on adjacent output gray levels. The detailed process is described as below.

a) The density zones to be adjusted for controlling the shapes of the dots are determined according to the stability and the linear output feature of the multi-bit depth imaging apparatus.

The low-density zone (171-255) and the medium-density zone (84-171) are determined to be adjusted in the embodiment.

b) The shapes of the dots to be adjusted are determined, according to the technical parameters for adjusting the pulse-width in the apparatus, as well as the existing random shapes of the dots in the density zones and the requirements relating to the output stability of the apparatus.

Figure 2:
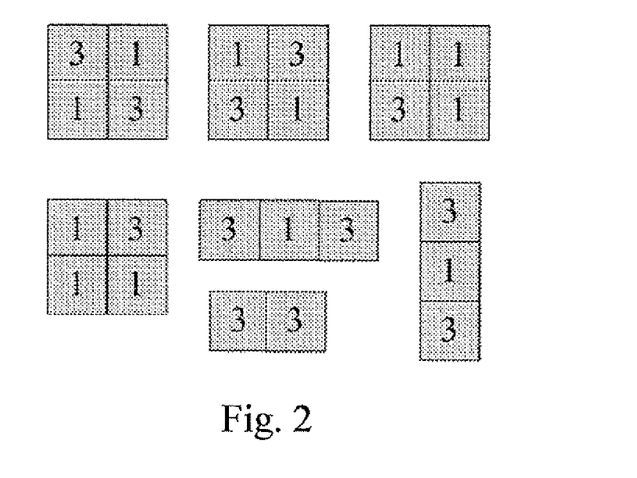
FIG. 2 is a schematic diagram illustrating the shapes of dots in the low-density zone before adjustment.
Figure 3:
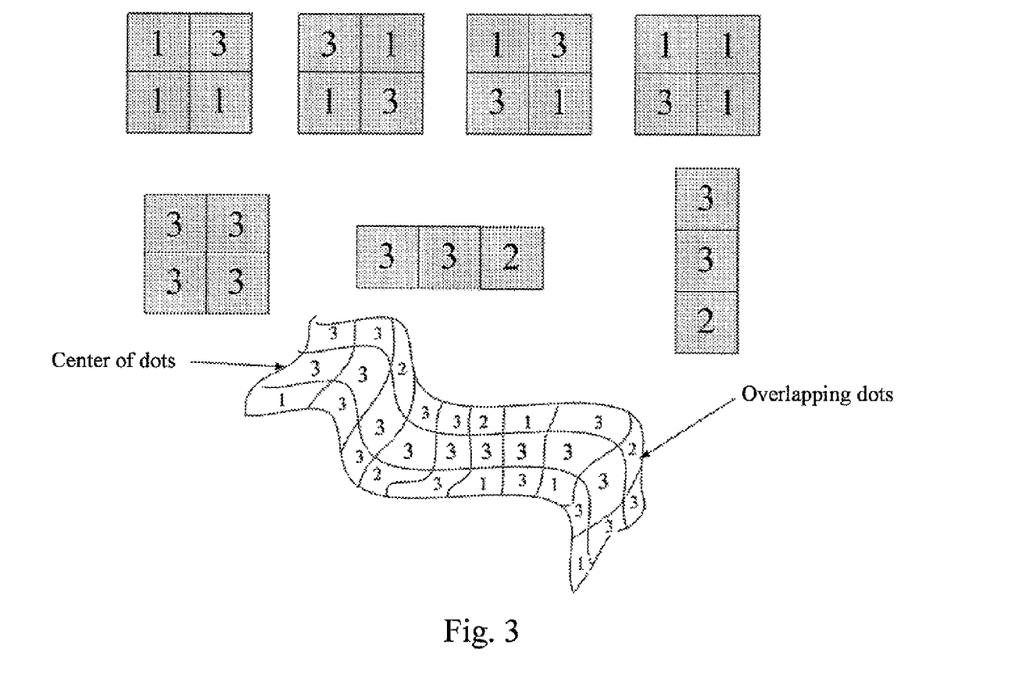
FIG. 3 is a schematic diagram illustrating the shapes of dots in the medium-density zone before adjustment.

In the embodiment, the shapes of the dots in the low-density zone (171-255) to be adjusted are shown in FIG. 2 and those in the medium-density zone (84-171) to be adjusted are shown in FIG. 3.

c) The desired and undesired shapes of the dots are respectively determined by the shapes of the dots determined in the step b) and the imaging feature of the output apparatus.

Figure 4:
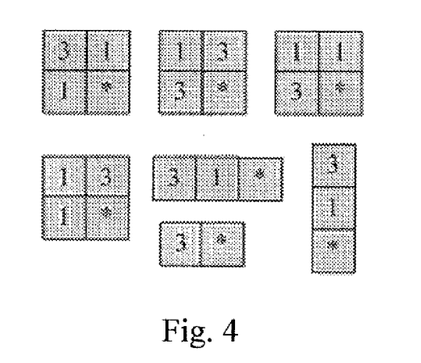
FIG. 4 is a schematic diagram illustrating the shapes of dots in the low-density zone after adjustment.
Figure 5:
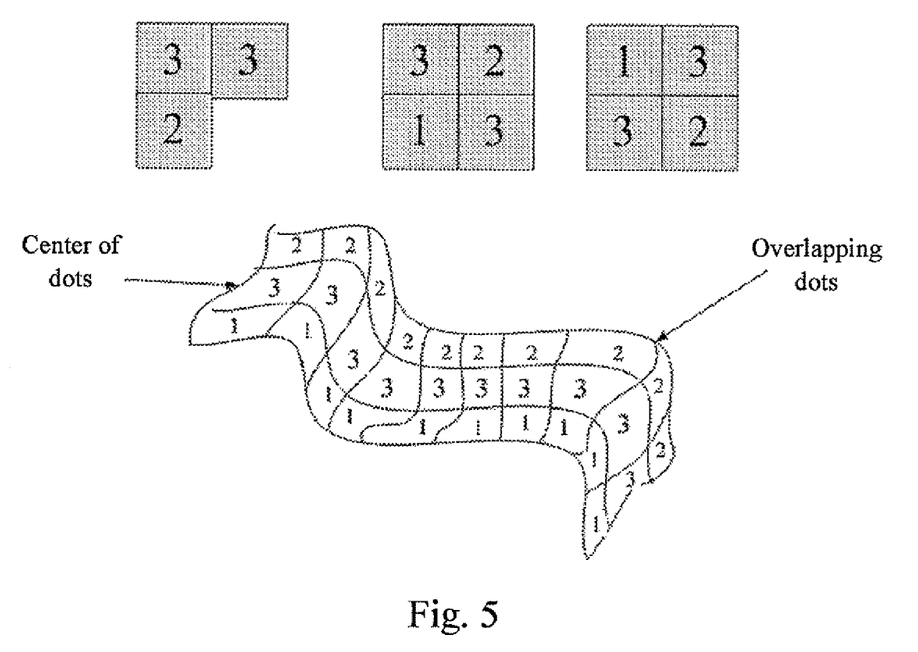
FIG. 5 is a schematic diagram illustrating the shapes of dots in the medium-density zone after adjustment.

In this embodiment, the target shapes of the dots in the low-density zone are shown in FIG. 4, wherein * represents the output gray level to be adjusted. The value of * should be equal to 1 or 0. The target shapes of the dots in the medium-density zone are shown in FIG. 5. In ideal conditions, the gray level at the center of a 2-bit dot is equal to 3.

d) Finally, by using a dynamic statistic algorithm with the adjacent output gray levels, the output range parameters of the multi-bit mixed dots are worked out in light of the density zones of the dots and existing output gray level gradations. According to the target shapes determined by the steps 2 and 3, the following pseudo-code is used to implement this step in the embodiment.

Figure 1:
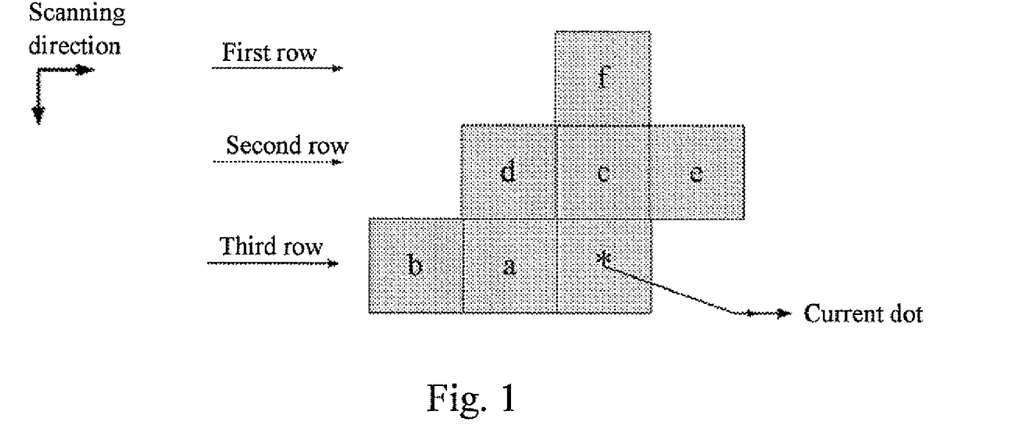
FIG. 1 is a diagram illustrating the principle of the dynamic statistic algorithm with adjacent output gray levels.

In the dynamic statistic algorithm with the adjacent output gray levels, the process for setting the controlled dots comprises:

i) letting the output gray level of the dot which is preceding to the current dot be a and that of the dot which is preceding to the dot with the output gray level a be b;

ii) letting the output gray level of the dot which is above the current dot be c, that of the dot which is preceding to the dot with the output gray level c be d, and that of the dot which is following to the dot with the output gray level c be e;

iii) letting the output gray level of the dot which is above the dot with the output gray level c be f;

iv) letting statistic parameters for the output gray levels around the current dot as below:

| $Sum_1 = a + c + d$ | $Sum_2 = a + b$ | $Sum_3 = c + f$ |
|---|---|---| wherein, a, b, c, d, e, f $\epsilon$[0, 3] (In practice, the 2-bit dots have four output gradations). FIG. 1 which shows the exemplary distribution is a diagram illustrating the principle of the dynamic statistic algorithm with the adjacent output gray levels.

The following pseudo-code shows how to logically implement the 2-bit dots statistic algorithm.

```
IF (the value of the input pixel □[84, 171])  the medium-density zone
{
  IF (Sum₁==9)
     the binary range of the output gray levels is [10, 01]
     ELSE IF (a!=0&&c!=0&&d!=0&& the value of the input
     pixel□[123, 171])
        the binary range of the output gray levels is [00, 00]
     ELSE IF(Sum₃>=5 && the value of the input pixel□[123, 171])
        the binary range of the output gray levels is [00, 00]
     ELSE IF(Sum₁<3 && the value of the input pixel□[139, 171])
        the binary range of the output gray levels is [11, 00]
     ELSE IF(Sum₂==6 && the value of the input pixel□[123, 171])
        the binary range of the output gray levels is [00, 00]
     ELSE IF(Sum₁>=7 && the value of the input pixel□[139, 171])
        the binary range of the output gray levels is [00, 00]
     ELSE
        outputting in light of the dynamic gradation-changeable mechanism
}
```

```
IF (the value of the input pixel □[171, 255])  the low-density zone
{
  IF (a==3 || c==3)
  {
     IF ( (a==3 && c==3) ||
        (a==3 && (c!=3 && c!=0)) ||
        (a!=3 && a!=0) && c==3))
     the binary range of the output gray levels is [00, 00]
     ELSE
        the binary range of the output gray levels is [01, 00]
  }
  ELSE IF (((a!=3 && a!=0) && (c!=3 && c!=0)) ||
        (c!=3 && c!=0 && d==0 && e==0) ||
        a!=3 && a!=0 && b== 3)
     the binary range of the output gray levels is [00, 00]
  ELSE
     the binary range of the output gray levels is [11, 00]
}
```

Figure 6:
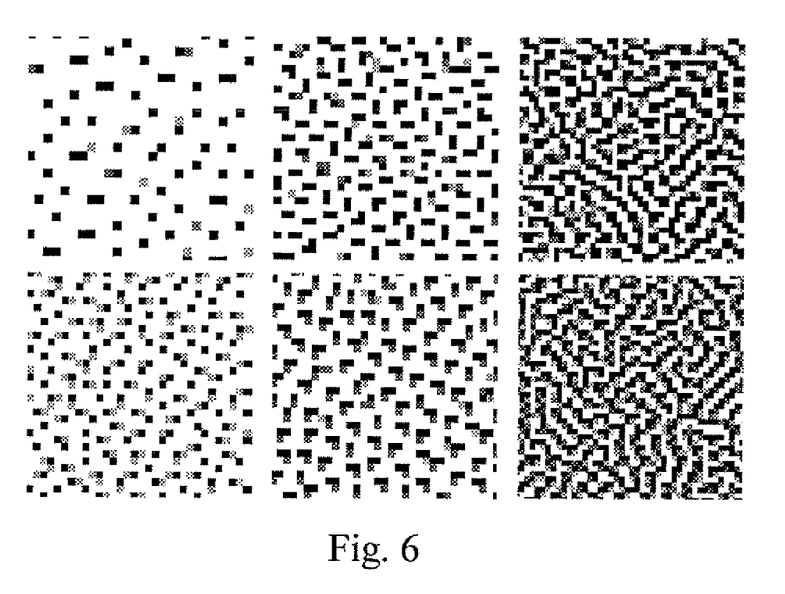
FIG. 6 shows the contrast of the output effects of dots.

Using the apparatus with the 2-bit imaging depth, the 2-bit FM-AM mixed screening can be achieved by implementing the above steps in the embodiment. FIG. 6 shows the comparison of the effect of the 2-bit FM-AM mixed screening with that of the conventional 2-bit mixed screening. In FIG. 6, the patterns in the first row show the examples before adjusting and those in the second row show the examples after adjusting.

The present invention is not limited to the embodiments mentioned above. Other embodiments obtained by the skilled in the art according to the technical solutions in the present invention should be within the scope of the technical innovation of the present invention.

The invention claimed is:

1. A method for controlling shapes of FM-AM mixed dots on a multi-bit depth imaging apparatus, comprising:
    1) dividing averagely an interval [0, 255] into $2^n-1$ gradations in light of a bit depth n of the apparatus:
        [0, $R_1$], [$R_1$, $R_2$], . . . , [$R_{i-1}$, $R_i$], . . . ($R_{2-2}{}^n$, 255], wherein i is a positive integer and less than $2^n-2$, corresponding ranges of a dot-matrix of bit-outputting are
        (0, $Out_1$), ($Out_1$, $Out_2$), . . . , ($Out_{i-1}$, $Out_i$), . . . ($Out_{2-2}{}^n$, 11 . . . 1),
    the $Out_i$ being a binary representation of the n-bit depth, and a threshold $M_i$ of a central point of each of the gradations is sampled as a threshold comparison parameter for the gradation;
    2) setting output probability thresholds with a n-bit imaging depth in the interval [0, 255];
    3) processing respectively the dots in the $2^n-1$ gradations ($R_{i-1}$, $R_i$) based on an FM-AM mixed screening process using a dual-feedback error diffusion; and
    4) computing dynamically output dot-matrix data, by using a dynamic gradation-changeable output mechanism and a dynamic statistic algorithm with adjacent output gray levels in light of the probability thresholds $F_i$ and an accumulated value ShapeCur for controlling the shape of a current dot, to control the shapes of the dots, when mixed screening in the gradations ($R_{i-1}$, $R_i$) is achieved.

2. The method of claim 1, wherein the step 2) further comprises
    setting $2^n-2$ integers $L_1, L_2, \ldots, L_i, \ldots, L_{2-2}{}^n$ as the output probability thresholds with the n-bit imaging depth, and adjusting the probability thresholds based on requirements of the apparatus.

3. The method of claim 1, wherein the step 4) further comprises:
    (a) determining density zones to be adjusted for controlling the shapes of the dots in light of a linear output feature of the apparatus;
    (b) determining the shapes of the dots to be adjusted in light of parameters for adjusting a pulse-width in the apparatus, existing random shapes of the dots in the density zones, and requirements relating to a stability of the apparatus;
    (c) determining desired and undesired shapes of the dots, respectively, in light of the determined shapes of the dots to be adjusted in the step (b) and imaging features of the apparatus; and
    (d) setting controlled dots around the current dot by using the dynamic statistic algorithm with the adjacent output gray levels, in light of the density zones of the FM-AM mixed dots and existing output gray level gradations, so as to work out output range parameters of the mixed dots.

4. The method of claim 3, wherein the dynamic statistic algorithm in the step (d) comprises:
    i) letting the output gray level of a dot which is preceding to the current dot be a and that of a dot which is preceding to the dot with the output grey level a be b;
    ii) letting the output gray level of a dot which is above the current dot be c, that of a dot which is preceding to the dot with the output grey level c be d, and that of a dot which is following to the dot with the output grey level c be e;
    iii) letting the output gray level of a dot which is above the dot with the output grey level c be f, and
    iv) letting statistic parameters for the output gray levels around the current dot as below:

| $Sum_1$ = a + c + d | $Sum_2$ = a + b | $Sum_3$ = c + f |
| --- | --- | --- | wherein, $Sum_1$ denotes a weighted sum of the output gray levels in a 2×2 matrix around the current dot, $Sum_2$ denotes a weighted sum of the output gray levels of two dots preceding horizontally to the current dot, and $Sum_3$ denotes a weighted sum of the output gray levels of two dots preceding vertically to the current dot.

5. The method of any of claim 1, wherein the dynamic gradation-changeable output mechanism in the step 4) comprises:

generating a pseudo-random value of the current dot in light of ShapeCur:

$$F_i = \text{random}(\text{ShapeCur}) \qquad \text{Formula 1}$$

wherein, the pseudo-random function random is to be generated automatically in a compiling environment, $F_i \in [0, 255]$; and the output dot-matrix data are computed dynamically:

$$\text{OUT} = \begin{cases} I_1 = \begin{cases} 0 & \dots F_i \in [0, L_1] \\ Out_1 & \dots F_i \in (L_1, L_2] \\ \dots \\ Out_{i-1} & \dots F_i \in (L_{i-2}, L_{i-1}] \end{cases} \\ I_2 = \begin{cases} Out_i & \dots F_i \in (L_{i-1}, L_i] \\ Out_{i+1} & \dots F_i \in (L_i, L_{i+1}] \\ \dots \\ 11 \dots 1 & \dots F_i \in (L_{2^n - 2}, 255]. \end{cases} \end{cases} \qquad \text{Formula 2}$$

6. The method of any of claim 2, wherein the dynamic gradation-changeable output mechanism in the step 4) comprises:

generating a pseudo-random value of the current dot in light of ShapeCur:

$$F_i = \text{random}(\text{ShapeCur}) \qquad \text{Formula 1}$$

wherein, the pseudo-random function random is to be generated automatically in a compiling environment, $F_i \in [0, 255]$; and the output dot-matrix data are computed dynamically:

$$\text{OUT} = \begin{cases} I_1 = \begin{cases} 0 & \dots F_i \in [0, L_1] \\ Out_1 & \dots F_i \in (L_1, L_2] \\ \dots \\ Out_{i-1} & \dots F_i \in (L_{i-2}, L_{i-1}] \end{cases} \\ I_2 = \begin{cases} Out_i & \dots F_i \in (L_{i-1}, L_i] \\ Out_{i+1} & \dots F_i \in (L_i, L_{i+1}] \\ \dots \\ 11 \dots 1 & \dots F_i \in (L_{2^n - 2}, 255]. \end{cases} \end{cases} \qquad \text{Formula 2}$$

7. The method of any of claim 3, wherein the dynamic gradation-changeable output mechanism in the step 4) comprises:

generating a pseudo-random value of the current dot in light of ShapeCur:

$$F_i = \text{random}(\text{ShapeCur}) \qquad \text{Formula 1}$$

wherein, the pseudo-random function random is to be generated automatically in a compiling environment, $F_i \in [0, 255]$; and the output dot-matrix data are computed dynamically:

$$\text{OUT} = \begin{cases} I_1 = \begin{cases} 0 & \dots F_i \in [0, L_1] \\ Out_1 & \dots F_i \in (L_1, L_2] \\ \dots \\ Out_{i-1} & \dots F_i \in (L_{i-2}, L_{i-1}] \end{cases} \\ I_2 = \begin{cases} Out_i & \dots F_i \in (L_{i-1}, L_i] \\ Out_{i+1} & \dots F_i \in (L_i, L_{i+1}] \\ \dots \\ 11 \dots 1 & \dots F_i \in (L_{2^n - 2}, 255]. \end{cases} \end{cases} \qquad \text{Formula 2}$$

8. The method of any of claim 4, wherein the dynamic gradation-changeable output mechanism in the step 4) comprises:

generating a pseudo-random value of the current dot in light of ShapeCur:

$$F_i = \text{random}(\text{ShapeCur}) \qquad \text{Formula 1}$$

wherein, the pseudo-random function random is to be generated automatically in a compiling environment, $F_i \in [0, 255]$; and the output dot-matrix data are computed dynamically:

$$\text{OUT} = \begin{cases} I_1 = \begin{cases} 0 & \dots F_i \in [0, L_1] \\ Out_1 & \dots F_i \in (L_1, L_2] \\ \dots \\ Out_{i-1} & \dots F_i \in (L_{i-2}, L_{i-1}] \end{cases} \\ I_2 = \begin{cases} Out_i & \dots F_i \in (L_{i-1}, L_i] \\ Out_{i+1} & \dots F_i \in (L_i, L_{i+1}] \\ \dots \\ 11 \dots 1 & \dots F_i \in (L_{2^n - 2}, 255]. \end{cases} \end{cases} \qquad \text{Formula 2}$$

9. The method of claim 5, wherein the following two processes for controlling dynamically the output gray levels are used in the step 4): a process for dynamic gradation-changeable output and a dynamic statistic process with the adjacent output gray levels.

10. The method of claim 6, wherein the following two processes for controlling dynamically the output gray levels are used in the step 4): a process for dynamic gradation-changeable output and a dynamic statistic process with the adjacent output gray levels.

11. The method of claim 7, wherein the following two processes for controlling dynamically the output gray levels are used in the step 4): a process for dynamic gradation-changeable output and a dynamic statistic process with the adjacent output gray levels.

12. The method of claim 8, wherein the following two processes for controlling dynamically the output gray levels are used in the step 4): a process for dynamic gradation-changeable output and a dynamic statistic process with the adjacent output gray levels.

13. The method of claim 1, wherein the step 3) further comprises:
 (a) carrying out an operation T of threshold comparison on a final input value g″(m, t) of a current pixel of an original image, and then converting a result of the operation to a corresponding value b(m, t) of the current pixel for a halftone image;
 (b) comparing the value b(m, t) of the current pixel with an input value g′(m, t) of the current pixel to obtain a difference between b(m, t) and g′(m, t), wherein the difference is an error value e(m, t), and the input value g′(m, t) is used for the operation T of threshold comparison;
 (c) multiplying the error value e(m, t) by preset weight distribution coefficients through an error diffusion filter e and then diffusing results of the multiplying to unprocessed pixels around the current pixel, wherein each of the diffused results to the unprocessed pixels around the current pixel is weightedly added to an original input value g(m, t) of the corresponding pixel of the original image to obtain an input value g′(m, t) of the corresponding pixel of the original image;
 (d) diffusing processed results to corresponding unprocessed pixels surrounding the current pixel, respectively, and weightedly adding each of the diffused processed results to the original input value g(m, t) of the corresponding pixel of the original image to obtain the final input value g"(m, t) of the corresponding pixel, wherein the processed results are obtained by implementing a multiplying operation on the output value b(m, t) of the current pixel using a diffusion filter w which has been processed with a dithering algorithm, and the step (d) is implemented in parallel with the steps (b) and (c); and (e) repeating the steps (a)-(d) until the original input values g(m, t) of all pixels are processed.

14. The method of claim 13, wherein the step (a) uses a process of bidirectional scanning when the original image is scanned, wherein, when a certain row is scanned from left to right, a next row is subsequently scanned from right to left.

15. The method of claim 13, wherein the error diffusion filter e uses a diffusion principle and a weight distribution mode as below:

|       |       | **    | $d_5$ | $d_3$ |
|-------|-------|-------|-------|-------|
| $d_2$ | $d_4$ | $d_5$ | $d_4$ | $d_2$ |
| $d_1$ | $d_2$ | $d_3$ | $d_2$ | $d_1$ | wherein, ** represents the current pixel's position, each of arithmetic ratios on other positions represents the diffusion weight coefficient relative to the current pixel, and the diffusion weight coefficients are taken in [0, 1] and satisfy an expression as below:

$$2 \times d_1 + 4 \times d_2 + 2 \times d_3 + 2 \times d_4 + 2 \times d_5 \in [0,1].$$

16. The method of claim 14, wherein the error diffusion filter e uses a diffusion principle and a weight distribution mode as below:

|       |       | **    | $d_5$ | $d_3$ |
|-------|-------|-------|-------|-------|
| $d_2$ | $d_4$ | $d_5$ | $d_4$ | $d_2$ |
| $d_1$ | $d_2$ | $d_3$ | $d_2$ | $d_1$ | wherein, ** represents the current pixel's position, each of arithmetic ratios on other positions represents the diffusion weight coefficient relative to the current pixel, and the diffusion weight coefficients are taken in [0, 1] and satisfy an expression as below:

$$2 \times d_1 + 4 \times d_2 + 2 \times d_3 + 2 \times d_4 + 2 \times d_5 \in [0,1].$$

17. The method of claim 15, wherein a diffusion mode of the diffusion filter w is set as:

|       | **    | $w_0$ |
|-------|-------|-------|
| $w_3$ | $w_2$ | $w_1$ | wherein, a scanning direction is from left to right, ** represents the current pixel's position, each of parameters on other positions represents the diffusion weight coefficient relative to the current pixel, the parameters are taken in [0, 1] and satisfy an expression as below:

$$w_{sum} = (w_0 + w_1 + w_2 + w_3) \in [0,1];$$ and the dithering algorithm for the diffusion filter w in the step (d) are as below:

$$fRand = (R(m,t)/R\_MAX - 0.5) \times cDither$$

$$dw_0 = w_0 - fRand$$

$$dw_2 = w_2 + fRand$$

$$dw_1 = w_1 + fRand$$

$$dw_3 = w_3 - fRand$$

wherein, fRand is a parameter for fine adjusting dithering; R(m, t) is a parameter with random value for the current dot being scanned; R_MAX is a maximum of a random parameter R(i); cDither is a parameter for adjusting amplitude of dithering; and $dw_0 \sim dw_3$ are the diffusion weight coefficients of the diffusion filter w in different directions after dithering.

18. The method of claim 16, wherein a diffusion mode of the diffusion filter w is set as:

|       | **    | $w_0$ |
|-------|-------|-------|
| $w_3$ | $w_2$ | $w_1$ | wherein, a scanning direction is from left to right, ** represents the current pixel's position, each of parameters on other positions represents the diffusion weight coefficient relative to the current pixel, the parameters are taken in [0, 1] and satisfy an expression as below:

$$w_{sum} = (w_0 + w_1 + w_2 + w_3) \in [0,1];$$ and the dithering algorithm for the diffusion filter w in the step (d) are as below:

$$fRand = (R(m,t)/R\_MAX - 0.5) \times cDither$$

$$dw_0 = w_0 - fRand$$

$$dw_2 = w_2 + fRand$$

$$dw_1 = w_1 + fRand$$

$$dw_3 = w_3 - fRand$$

wherein, fRand is a parameter for fine adjusting dithering; R(m, t) is a parameter with random value for the current dot being scanned; R_MAX is a maximum of a random parameter R(i); cDither is a parameter for adjusting amplitude of dithering; and $dw_0 \sim dw_3$ are the diffusion weight coefficients of the diffusion filter w in different directions after dithering.

* * * * *